United States Patent [19]

Chow et al.

[11] 4,333,496
[45] Jun. 8, 1982

[54] SURGE RELIEVER WITH INCREASE CAPACITY FLOW

[75] Inventors: Peter C. M. Chow, Newark; William N. Ringer, Pleasant Hill, both of Calif.

[73] Assignee: Grove Valve and Regulator Company, Oakland, Calif.

[21] Appl. No.: 186,858

[22] Filed: Sep. 15, 1980

[51] Int. Cl.³ ............................................. F16K 31/12
[52] U.S. Cl. .................................... 137/489; 137/492
[58] Field of Search .......................... 137/488, 489, 492

[56] References Cited

U.S. PATENT DOCUMENTS 3,754,566 8/1973 Gemigniani .......................... 137/488
3,911,941 10/1975 Gerbic ............................. 251/61.1 X

*Primary Examiner*—Alan Cohan

[57] ABSTRACT

A liquid pipeline surge reliever system wherein a main surge relief valve of the expansible tube type is connected into a diverter line from the pipeline. The valve opens when pressure in the diverter line exceeds a jacket control pressure. The jacket is evacuated through a bleed valve, which may be a smaller expansible tube valve but with enough capacity to very rapid evacuation of the main valve jacket. Gas pressure from a suitable source is connected to the main valve jacket which, in turn, is connected to both the jacket and the inlet of the bleed valve. Pressure of pipeline liquid in a sensing line opens a pilot valve through which the jacket of the bleed valve is exhausted should the pipeline pressure reach a predetermined surge level. Pipeline pressure at that surge level also closes an on-off valve in the gas supply line while the surge is being relieved.

10 Claims, 1 Drawing Figure

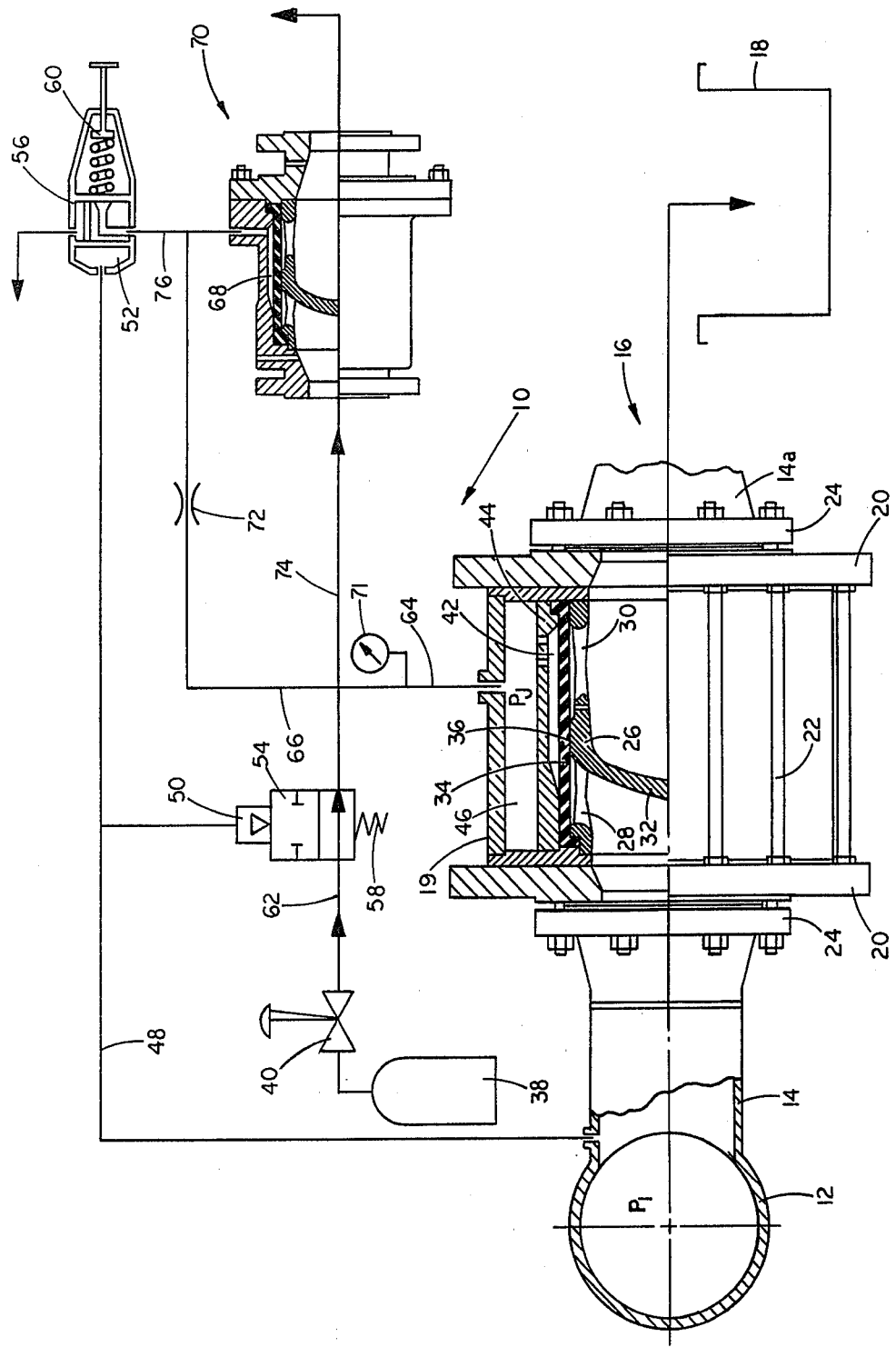

SURGE RELIEVER WITH INCREASE CAPACITY FLOW

BACKGROUND OF THE INVENTION

Surge relief systems frequently employ large flexible tube type valves which are opened at a pipeline surge pressure level to dump a quantity of liquid into a reservoir until the surge is relieved. A valve of that type generally includes a flexible tube which is surrounded by a jacket containing a gas at the pipeline surge pressure. Rapid actuation is enabled by reason of the compressibility of the gas in the jacket, but such compression causes increased resistance to full expansion of the flexible tube out to the chamber wall, and therefore, limits opening capacity of the relief valve during the surge, when it is most needed. Representative of the type of system just described are those shown in Gerbic et al U.S. Pat. No. 3,911,941 granted Oct. 14, 1975, Brumm U.S. Pat. No. 3,972,364 granted Oct. 3, 1976, Allen U.S. Pat. No. 3,933,172 granted Jan. 20, 1976 and Smith et al pending application for patent, Ser. No. 149,701 filed May 14, 1980 for "Energy Dissipating Pipeline Surge Relief System."

OBJECTS OF THE INVENTION

It is an object of this invention to provide a surge relief system, including an expansible tube valve, which will provide maximum flow capacity when a surge pressure is detected.

It is a further object of this invention to provide an an expansible tube surge relief valve which will enable maximum utilization of relief valve capacity with minimum pressure accumulation over the set relief pressure.

Other objects and advantages of this invention will become apparent from the description to follow, particularly when read in conjunction with the accompanying drawing.

SUMMARY OF THE INVENTION

In carrying out this invention, a large capacity relief valve of the flexible tube type is connected into a branch or diverter line from the main pipeline. The control chamber or jacket of the main relief valve is charged by gas from a suitable source at a set pipeline surge level so that the main valve will open when, but only when, that level is exceeded, to dump a quantity of liquid into a reservoir until the surge subsides. In the case of a large surge which taxes the capacity of the main relief valve, a pilot valve opens to evacuate the control jacket of a bleed valve, which preferably is also of the flexible tube type. The pilot valve is set to open for a short time to relieve just the crest of a surge and then to close to allow the main relief valve to continue to relieve against the jacket pressure. In the meantime, a normally open, pressure-actuated, on-off valve in the gas supply line is closed during the time the pilot valve is open so that bleeding does not continue. In operation, the pilot valve when opened, exhausts the relatively small control jacket of the bleed valve, allowing it to bleed off some of the control gas in the main valve jacket, which may then open to increased capacity flow.

BRIEF DESCRIPTION OF THE DRAWING

The drawing is a schematic diagram of the surge reliever system of this invention with main valve and evacuation valve shown partially in section.

DESCRIPTION OF A PREFERRED EMBODIMENT

Referring now to the drawing with greater particularity, the surge relief system 10 of this invention is adapted for operation in conjunction with a liquid transporting pipeline 12, and it is installed in a diverting or surge relief line 14 in open communication therewith. Surges frequently occur when the flowing liquid is subjected to sudden changes in flow conditions, as when a pump (not shown) is activated or deactivated. When such a surge exceeds a predetermined design pressure level for safe pipeline operation, the system 10 of this invention is operational to relieve the surges by diverting a quantity of liquid from the pipeline 12, through the diverting line 14 and surge relief valve 16, to a reservoir 18.

The reliever valve 16 may be of the expansible tube type, such as that shown in Bryant U.S. Pat. No. 3,272,470 granted Sept. 13, 1966. Specifically, the surge relief valve 16 may comprise a cylindrical body shell 19 which is clamped between two closure plates 20, as by means of studs 22. The closure plates 20 are, in turn, secured by conventional means to complementary flanges 24 in the diverting line with the outlet line 14a directed to the reservoir 18.

A slotted core 26 is carried within the valve body 19 and includes spaced, circumferential rows of inlet and outlet slots 28 and 30 on opposite sides of an intermediate barrier 32. A flexible, expansible tube 34 is stretched over the cylindrical sealing surface 36 of the barrier, normally to prevent flow from the inlet slots 28 to the outlet slots 30. A gas, such as nitrogen from a suitable source 38, is regulated by a regulator 40 to a predetermined pressure $P_j$ to be maintained in the jacket 42 surrounding the expansible tube 34. The jacket pressure $P_j$ is well above normal pipeline pressure, but within the safe design limits of the pipeline, and will enable the valve 16 to open and relieve a surge when that pressure is exceeded. A restraining sleeve 44 with perforations therein limits the expansion of the rubber tube 34, while the spacious chamber 46 around the perforated sleeve provides volume for compression of the control gas.

A sensing line 48, which opens into the diverting conduit 14 directs pipeline pressure $P_1$ into sensing chambers 50 and 52 of a pressure actuated on-off valve 54 and gas pilot 56 respectively. The pressure responsive on-off valve 54 is normally open and is set by suitable spring means 58 to close in anticipation of the opening of pilot valve 56 when the pressure in line 48 reaches a predetermined dangerous or risk surge level which demands pipeline relief. The pilot valve 56 is set by suitable spring adjustment means 60 to open when that predetermined surge level is reached, for a purpose hereinafter to be described.

The pressure actuated on-off valve 54 is mounted in a gas supply line 62 from the source 38. The gas supply line 62 is then connected to a first branch 64 for loading the jacket 42 of the surge relief valve 16 and a second branch line 66 for loading the jacket 68 of a smaller expansible tube valve 70 through which the jacket 42 may be evacuated rapidly, as will be described. The jacket pressures at 42 and 68 may be monitored at 71.

An orifice 72 is provided in the second branch line 66 and evacuation line 74 connects with the branch line 64 to enable the main relief valve jacket to be evacuated. The jacket of the bleed valve 70 is evacuated through line 76 and the pilot 56.

The operation of the system will now be described. In normal operation, with pipeline pressures P1 within the safe range of operation, the main surge relief valve jacket 42 remains fully loaded through the normally-open pressure actuated valve 54. The jacket 68 of the bleed valve 70 is also loaded to maintain that valve closed, evacuation being prevented by the normally-closed pilot 56.

In the event of a surge, the main surge relief valve 16 starts to open slowly as the surge pressure in the diverter conduit commences to overcome the jacket pressure Pj. If the surge reaches a predetermined set point, the normally-open pressure actuated valve 54 is closed to prevent further flow through supply line 62. Then, at a slightly higher pressure, the pilot valve 56 is opened to commence evacuation of the jacket 68 of the bleed valve 70. This conditions the smaller bleed valve 70 to evacuate the main valve jacket 42, enabling further expansion of the tube 34 for greater flow through the slots 28 and 30 and out the outlet 14a to the reservoir 18.

When the surge pressure starts to subside and the line pressure P1 and reaches the set pressure of the pilot valve 56 it closes to prevent further evacuation of the bleed valve jacket 68 while the main surge relief valve continues to relieve line fluid to the reservoir 18. At a slightly lower pressure or risk pressure level the on-off valve 54 is opened so that pressures in the two jackets 42 and 68 starts to build up while the main valve 16 continues to relieve the surge.

Hence, the pilot valve 56 remains open only long enough to enable the main surge relief valve 56 to return pipeline pressure to set point of the pilot valve 56, which set point is above the surge-relieving level. Its function is to condition the bleed valve to evacuate the main valve jacket for just that normally brief period necessary to increase the capcity of the main valve 16 to relieve the crest of the surge below the danger level, and to then allow the main valve 16 to continue to relieve by compressing the gas confined in the jacket 42,46. This brief, peak load function of the pilot valve 56, coupled with the shutting off of the gas supply by the on-off valve, minimizes bleeding of gas and facilitates recharging the system.

While this invention has been described in conjunction with a preferred embodiment thereof, it is obvious that modifications and changes therein can be made by those skilled in the art to which it pertains without departing from the spirit and scope of this invention, as defined by the claims appended hereto.

What is claimed as invention is:

1. A liquid pipeline surge reliever system comprising:
    a diverter line for connection into a liquid pipeline;
    a main surge relief valve in said diverter line having a first pressure gas control chamber, said main valve being conditioned to open to a reservoir when liquid on the upstream side thereof reaches a pressure to overcome that in said first control chamber, and a source of gas under pressure connected to said first control chamber;
    the improvement comprising:
    a control pressure bleed valve having a smaller second pressure gas control chamber and being conditioned to open when pressure on the upstream side thereof exceeds that in said second control chamber;
    one gas line connecting said first pressure control chamber to the inlet of said bleed valve and another gas line connecting said first control chamber to said second control chamber;
    a pilot valve conditioned to open when pressure being sensed therein exceeds a predetermined set, pipeline surge pressure;
    said second control chamber being connected to said pilot valve to be exhausted therethrough;
    a sensing line conducting pipeline fluid to said pilot valve so that if pressure therein reaches said set pressure, the pilot valve opens to exhaust said second control chamber, enabling gas from said first control chamber to open said bleed valve;
    a supply gas line connecting said pressure gas source to said first control chamber;
    a pressure actuated on-off valve in said supply gas line conditioned to close when pressure sensed thereby approaches said set pressure; and
    an actuating line connecting said sensing line to said on-off valve.

2. A liquid pipeline surge reliever system comprising:
    a diverter line for connection into a liquid pipeline;
    a main surge relief, expansible tube valve in said diverter line;
    said main surge relief valve including a circular barrier extending across a flow passage, an expansible tube stretched around said barrier, and a jacket space around said tube forming a first pressure gas control chamber of adequate volume to enable expansion of said tube without substantial increase in jacket pressure, said main valve being conditioned to open to a reservoir when liquid on the upstream side thereof reaches a pressure to overcome that in said first control chamber, and a source of gas under pressure connected to said first control chamber;
    the improvement comprising:
    a control pressure bleed valve having a smaller second pressure gas control chamber and being conditioned to open when pressure on the upstream side thereof exceeds that in said second control chamber;
    one gas line connecting said first pressure control chamber to the inlet of said bleed valve and another gas line connecting said first control chamber to said second control chamber;
    a pilot valve conditioned to open when pressure being sensed therein exceeds a predetermined set, pipeline surge pressure;
    said second control chamber being connected to said pilot valve to be exhausted therethrough;
    a sensing line conducting pipeline fluid to said pilot valve so that if pressure therein reaches said set pressure, the pilot valve opens to exhaust said second control chamber enabling gas from said first control chamber to open said bleed valve;
    the pressure of gas in said first control chamber being at a level to be overcome by a surge pressure in said diverter line at a first pressure level; and
    said pilot valve is set to open when pressure in said diverter line reaches a greater pressure level so that said main surge relief valve can open without bleeding said second control chamber unless said greater pressure level is reached.

3. The pipeline surge reliever system defined by claim 1 or 2 including:
- an orifice in said another gas line to retard flow therethrough while said second control chamber is being exhausted.

4. The pipeline slurge reliever system defined by claim 2 including:
- a supply gas line connecting said pressure gas source to said first control chamber;
- a pressure actuated on-off valve in said supply gas line conditioned to close when pressure sensed thereby approaches said set pressure; and
- an actuating line connecting said sensing line to said on-off valve.

5. The pipeline surge reliever system defined by claim 1 wherein said main surge relief valve comprises:
- an expansible tube valve including a circular barrier extending across a flow passageway;
- an expansible tube stretched around said barrier; and
- a jacket space around said tube forming said first control chamber.

6. The pipeline surge reliever system defined by claim 5 wherein said bleed valve comprises:
- a smaller expansible tube valve including a circular barrier extending across a flow passageway;
- an expansible tube stretched around said barrier; and
- a smaller jacket space around said tube forming said second control chamber.

7. The pipeline surge reliever system defined by claim 1 or 2 wherein:
- the outlets of said pilot valve and said control pressure exhaust valve open to the atmosphere.

8. The pipeline surge reliever system defined by claim 1 or 4 wherein:
- said supply gas line is connected to said one gas line, said another gas line and said first control chamber.

9. The pipeline surge reliever system defined by claim 1 wherein:
- the pressure of gas in said first control chamber is at a level to be overcome by a surge pressure in said diverter line at a first pressure level; and
- said pilot valve is set to open when pressure in said diverter line reaches a greater pressure level.

10. The pipeline surge reliever system defined by claim 1 or 4 wherein:
- the pressure of gas in said first control chamber is at a level to be overcome by a fluid pressure in said diverter line at a first surge pressure level;
- said on-off valve is set to close when pressure in said diverter line reaches a higher risk pressure level; and
- said pilot valve is set to open when pressure in said diverter line reaches a level slightly above said risk pressure level.

* * * * *